Feb. 23, 1971     A. L. SHOOK     3,564,744
AUTOMOTIVE SAFETY SIGNAL DEVICE
Filed Feb. 20, 1969
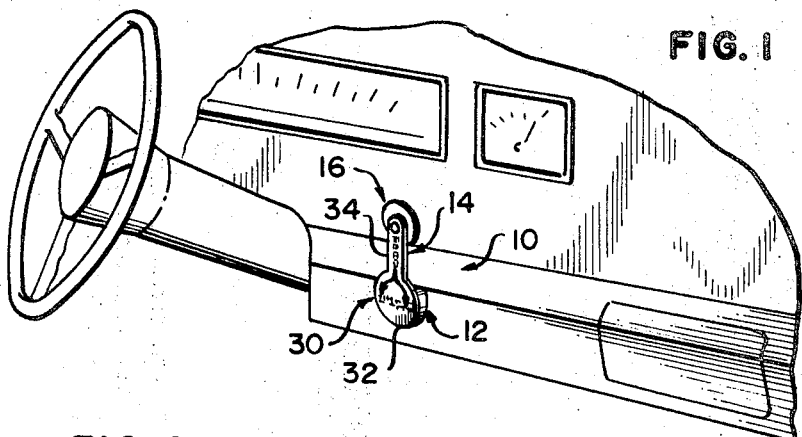
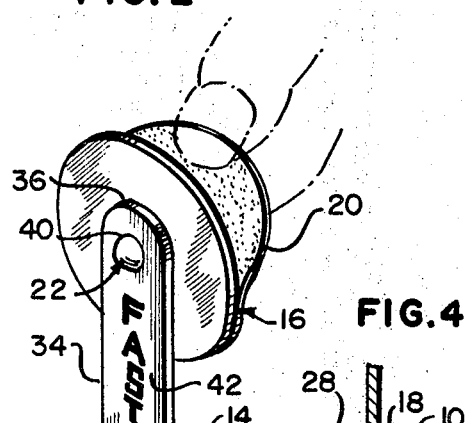
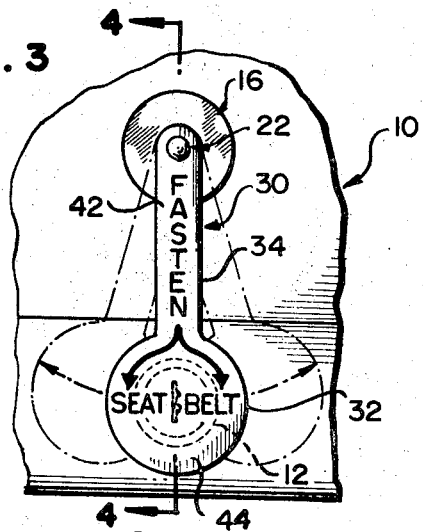
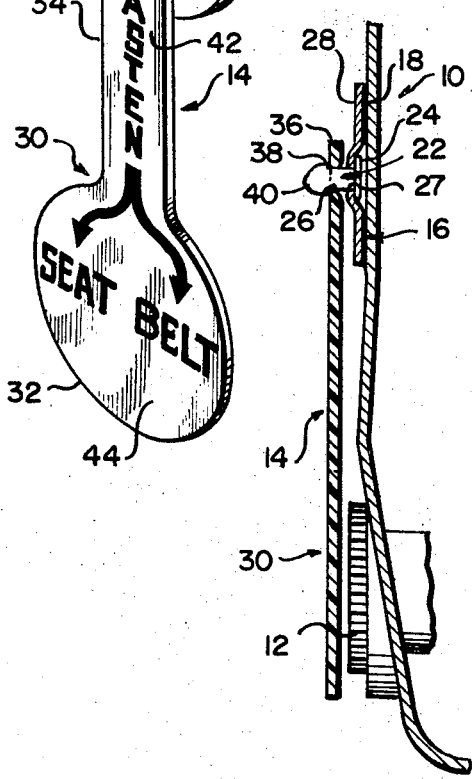
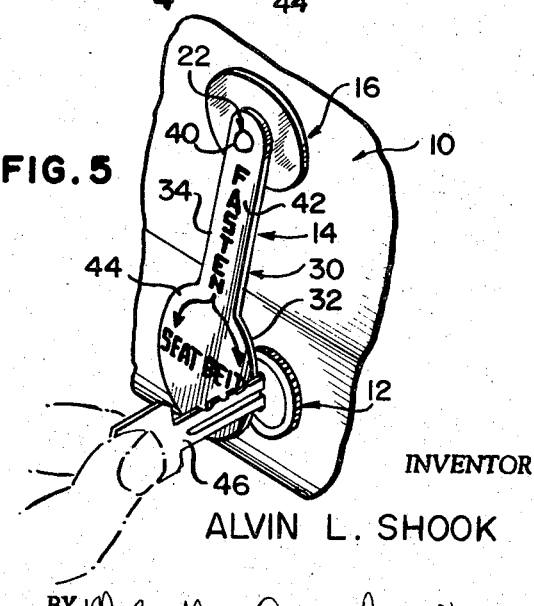
INVENTOR
ALVIN L. SHOOK
BY McCarthy, DePaoli & O'Brien
ATTORNEYS

United States Patent Office 3,564,744
Patented Feb. 23, 1971

3,564,744
AUTOMOTIVE SAFETY SIGNAL DEVICE
Alvin L. Shook, 301 S. Pearl, Salem, Ill. 62881
Filed Feb. 20, 1969, Ser. No. 800,856
Int. Cl. G09f 7/00
U.S. Cl. 40—125                                            1 Claim

ABSTRACT OF THE DISCLOSURE

An automotive safety signal device in the form of a simple and inexpensive ignition lock cover member which is pivotally mounted over the ignition lock in a normally obstructive manner and which must be visually recognized and physically moved aside by the driver in the act of inserting the ignition key into the ignition lock with the outer face of the cover member being prominently provided with warning signal means to alert the driver to fasten his seatbelt before starting the engine.

BACKGROUND OF THE INVENTION

(1) Field of the invention

The present invention generally appertains to new and novel improvements in safety signal devices and, more particularly, is directed to a new and novel safety signal device for use in connection with safety equipment on an automotive vehicle, especially to alert the driver of an automotive vehicle to fasten his seatbelt prior to starting the engine of the vehicle and to driving the vehicle.

(2) Description of the prior art

Ever since the safety value of the seatbelt in automobiles was definitely established years ago in a comprehensive pioneer study made by the Indiana State Police, it has been well recognized by safety experts and law enactment and enforcement people that seatbelts reduce the chance of injury and death in automobile accidents by at least 40 percent.

The safety value of seatbelts is so well established that most of the states and the Federal Government have passed legislation making it mandatory on the part of automotive manufacturers to equip their automobiles with seatbelts as standard safety equipment.

But, as in the instance of most safety equipment in general, the problem lies not in the required provision of seat belts in vehicles but in educating and alerting the drivers to use the seatbelts and to require their passengers to use the seatbelts. Of late, decisional law in some of the more advanced negligence law states is viewing the non-use of seatbelts by injured persons in an automobile, which is involved in an accident, as contributory negligence on their part so as to lead to a denial of recovery for their injuries. In driver's educational courses, which are now compulsory for youthful new drivers in most of the states, predriving habits are stressed. Among these habits, which are taught as routine before the ignition key is inserted into the ignition lock and the engine is started, is the one of fastening seatbelts.

Even the automobile manufacturers themselves have taken up the crusade and have equipped their automobiles with various and sundry warning signal devices. For example, there are lights that blink on and off after the ignition system is activated and before the emergency brake is released and that signal "Fasten Safety Belts." In addition, there are alarms and other audible signaling devices. Thus, there are presently available all types of visual audible warning signals to apprise the driver to fasten his seatbelt.

However, safety signal devices can be too complicated and thereby defeat their intended purpose of forming safety habits, and also signal devices can be so complex that they tend to wear out easily or to malfunction and, in so doing, have a deleterious effect on other components of the vehicle. For example, warning signals of an electrical nature can, when they malfunction, cause damage to the electrical system of the vehicle.

In order for a safety signal device to be of any appreciable value and to accomplish its intended purpose, it must be rather simple and independent of structural connection with operating components or the system of the automobile and yet it must be sufficient in its structural makeup and position that it serves to form the basis of unconscious motivation and habitual behavior pattern respecting the use of seatbelts by drivers and, through the drivers, by the passengers in an automobile.

SUMMARY OF THE INVENTION

The present invention involves the provision of a simple, very inexpensive, mechanical signal device which is in the structural nature of a closure or cover member for the ignition lock of an automobile. By virtue of a simple pivotal mounting means the cover member is mounted on the dashboard of an automobile in a position so as to obstructively, pivotally overlie the ignition lock. The outer face of the cover member has suitably provided thereon a warning message such as the words "FASTEN SEATBELT," with the warning words or other suitable and appropriate signal medium or character prominently displayed. Thus, the words or signal character may be formed in a way and from a material that will render them extremely visible and most demonstratively eye-catching.

Since the cover member will normally obscure and cover the ignition lock, it will be necessary for the driver to focus his attention on the outer face of the cover member while he is engaged in the physical act of moving the cover member to one side or out of an obstructive position with relation to the ignition lock as he inserts the key into the ignition lock. Thus, the physical act of attempting to start the engine necessitates the driver's visual observance and consequent mental recognition of the warning signal that his seatbelt should be fastened before he starts the automobile.

The pivotal mounting of the cover member is realized in a way that does not require factory installation of the signal device and in a manner that anyone can effect the mounting in a matter of seconds and without the utilization of any tools. The total makeup of the signal device, including its pivotal installation, is such that the device can be manufactured for a few cents, on an inexpensive, mass-production basis, thereby permitting the signal device to serve as a commercial give-away item for gasoline service stations and the like establishments which would be concerned with automotive safety.

The pivotal mounting of the cover member is effected by the utilization of a simple pivot pin which is carried by an adhesived face mounting member that is adapted to be stuck onto the dashboard of an automobile so that the pin extends outwardly slightly therefrom and consequently slightly outwardly from the dashboard. The cover member is swingably or pivotally carried by the pin and depends or hangs therefrom when the pin is mounted on the dashboard, with the adhesive mounting member being placed above the ignition lock in a position so that the cover member will obstructively overlie the ignition lock. Until the signal device is mounted on the dash board, the adhesive face of the mounting member is protected by a strippable backing sheet.

Accordingly, it can be appreciated that an important object of the present invention is to provide a simple automotive signal device for ensuring the use of seatbelts by creating an unconscious motivation and behavioral pattern as the result of the necessary mechanical act on the driver's part of inserting the ignition key into the ignition lock to start the engine.

A further important object of the present invention is to provide such a signal device which is devoid of any attachment or structural association with the working components or assembly of the vehicle and which is of such a structural nature that it can be given away as an advertising or good will article and can be installed in its operative position by anyone wihout any skill or the use of any tools.

BRIEF DESCRIPTION OF THE DRAWING

FIG. 1 is a fragmentary perspective showing of the dashboard area of an automobile wherein the ignition lock is located with such lock being obscured or covered by the safety signal device of the present invention, such device being shown in perspective in its mounted position of use.

FIG. 2 is a perspective view of the signal device in its original unattached condition and of a scale approximating the actual size of the device.

FIG. 3 is a front elevational view of the signal device mounted on the dashboard and showing the same in full lines covering the ignition lock and showing in dotted lines the release positions to which it can be deliberately swung for the forcible and deliberate insertion of the ignition key into the ignition lock.

FIG. 4 is a vertical sectional view taken substantially on line 4—4 of FIG. 3.

FIG. 5 is a fragmentary perspective showing of the signal device and the ignition lock with the signal device being moved aside from its covering position relative to the lock by the hand held ignition key during the driver's act of inserting the key into the lock.

DESCRIPTION OF THE PREFERRED EMBODIMENT

Referring now more particularly to the accompanying drawing, the reference numeral 10 generally designates the dashboard or panel-like means in the interior of a conventional automobile. A conventional ignition lock 12 for the ignition system of the automobile is housed in the dashboard, though, obviously, the present invention can be equally well used where the ignition lock is on the steering column or located in an area other than on the dashboard. For this reason, the expression "panel-like means" is intended to cover any area, including the dashboard, where the ignition lock would or could be located.

As shown explicitly in FIG. 2, the signal device 14 of the present invention includes a mounting or supporting means which is composed of a disc 16 formed from tough, sturdy and flexible material, such as heavy cardboard or suitable plastics. The disc has a rear mounting face which is coated with an adhesive layer 18. The adhesive layer 18 is covered by a strippable backing sheet 20 that normally covers the adhesive layer and which must be peeled off, as shown in FIG. 2, in order to expose the adhesive layer which serves to securely fix the supporting disc 16 on the panel-like means 10 above the ignition lock. The mounting or supporting means further includes a pivot pin 22 which has a flat head 24 on one end and a shank 26 inserted through a transverse aperture 27 in the disc. The flat head 24 engages behind the center of the rear face of the disc while the shank extends outwardly beyond the front face 28 of the disc.

The signal device further includes a cover or closure member 30 which is formed from cardboard, plastics or the like and which has a body portion 32 and an elongated hanging portion 34. The body portion may be any shape or size so as to overlie and obstructively obscure or hide the ignition lock 12. As shown for exemplary purposes in the drawing, the body portion 32 is circular or in the shape of a disc while the hanging or attaching portion 34 is elongated and radiates upwardly from the upper segment of the periphery of the circular body portion.

The attaching portion 34 has an upper free end portion 36 which is formed with a transverse aperture 38 that is pivotally mounted or swingably circumposed on the shank portion 26 of the pivot pin and is lockingly held thereon by the enlarged outer end 40 of the pivot pin 22.

The front face of the cover member 30 is provided with signal means in the form of alerting indicia, though any suitable warning character or signal medium may be employed and may be suitably formed or provided on the outer or front exposed face of the cover member. The front face of the cover member preferably is covered or coated with a reflective surface of a bright, glowing and arresting color.

As illustrated in the drawing, the front face 42 of the vertically disposed, hanging or attaching portion 34 of the cover member has the word "FASTEN" spelled out vertically thereon, with the letters of such word being colored or etched, printed, embossed or the like in a striking or contrasting manner to the front face which forms the background. The letters may be otherwise so formed and provided on the front face 42 that they stand out or project very prominently. The front face 44 of the body portion 32 of the cover member 30 is formed with the words "SEAT BELT" with such lettering being disposed across the face 44 and being formed or provided thereon in the same prominent and visually striking manner as the letters of the word "FASTEN." A pair of arrows that have a common tail end vertically below the bottom letter of the word "FASTEN" are curved around on the face 44 so as to point dramatically to the words "SEAT" and "BELT" with the heads of such arrows vertically overlying and pointing down at the words "SEAT" and "BELT." This arrangement is done not from a design standpoint for aesthetic reasons but from a utilitarian standpoint since the arrows, which may be in the form of etched or embossed lines in the faces 42 and 44, serve to connect up the words so as to cause a word association picture in the mind of the driver.

In the utilization of the signal device 14, the driver, after receiving the device, strips the protective backing sheet or paper 20 from the adhesive back of the supporting disc 16 and then presses the adhesive back or layer 18 on the panel-like means 10 above the ignition lock 12 so that the cover member swingably hangs from the pivot pin 22 with the body portion 32 of the cover member being juxtaposed in front of the ignition lock 12 and completely obscuring it. As shown in FIG. 5, in order for the driver to insert the ignition key 46 in the ignition lock 12, the driver must visually observe the cover member and exert a physical effort to cause the cover member to swing aside. In effecting such physical entrance of the key into the lock, the driver must notice and take cognizance of the message spelled out by the words. The driver thus has been apprised of the need to fasten his seatbelt and the constant reminders by the cover member, as the key is repeatedly inserted into the lock after swinging aside the cover member during repeated usage of the automobile, will hopefully have the effect of establishing a behavior pattern leading to constant use of the seatbelt by the driver and his passengers.

As long as the key 46 is in place in the ignition lock 12, the cover member 30 will be canted to one side or the other but when the key is withdrawn from the lock, the cover member will swing back to a true vertical position due to the weight of the large body portion on the lower end of the elongated and freely pivoted hanging portion 34. In such position, the body portion will completely cover the ignition lock thereby making it necessary to forcibly move it aside when the ignition key is next inserted into the lock.

What is claimed is:

1. A safety signal device for an automobile having a panel-like means in which an ignition lock for the ignition system of the automobile is located, said signal device comprising a relatively, small and thin flexible mounting strip having a first face covered with a adhesive layer and adapted to be stuck on the panel-like means and having a second face projected outwardly of the panel-like means, said strip being positioned on the panel-like means above the ignition lock, a pivot pin carried by the strip and projecting outwardly therefrom perpendicularly of the second face thereof, a cover member having an upper and a lower portion, said upper portion having an aperture receiving the pivot pin so that the upper portion is freely pivoted on the pin and the lower portion being of a cross-sectional size and area slightly greater than the ignition lock so that it normally obstructively overlies the ignition lock to hinder the insertion of an ignition key into the lock until it is forcibly moved aside by a driver in the act of inserting the ignition key to expose the ignition lock to view and permit physical access thereto so as to enable the driver to insert the key into the lock and said cover member having an outer face prominently provided with a warning signal means apprising the driver to fasten his seatbelt.

References Cited

UNITED STATES PATENTS

| | | | |
|---|---|---|---|
| 1,807,344 | 5/1931 | Roth | 40—125 |
| 2,201,127 | 5/1940 | Schechter | 40—330 |

FOREIGN PATENTS

| | | | |
|---|---|---|---|
| 558,088 | 2/1957 | Italy | 70—455 |

LAWRENCE CHARLES, Primary Examiner

U.S. Cl. X.R.

70—455